Patented Mar. 30, 1948

2,438,516

UNITED STATES PATENT OFFICE 2,438,516

POLYSTYRENE ELECTRIC INSULATING MATERIALS

Archibald Alan New, London W. C. 2, England, assignor to International Standard Electric Corporation, New York, N. Y.

No Drawing. Application June 17, 1942, Serial No. 447,475. In Great Britain July 15, 1941

1 Claim. (Cl. 260—36)

This invention relates to electrical insulating material and more particularly to electrical insulating material comprising polystyrene.

By the polymerisation of monomeric styrene a series of synthetic resins is formed having a wide range of physical properties, particularly as regards fusibility and flexibility, the polymers formed at high temperatures being readily fusible, but very brittle when cold, whereas polymers formed at room temperature are infusible and relatively tough. It is well known that all types of polymers of styrene have excellent insulating properties, particularly at very high frequencies ($10^6$ cycles per second and above). It is necessary for many electrical purposes, however, that the polystyrene be made appreciably softer and more flexible and also less brittle.

The aromatic hydrocarbons benzene, toluene and xylene, and monomeric styrene all plasticise polystyrene temporarily and do not appreciably alter its electrical properties when used in moderate amounts. They are however unsuitable because of their high vapour pressure which leads to loss of the plasticiser and consequent hardening of the polymerised styrene with the passage of time. Chlorinated diphenyls have also been used for some time as plasticisers for polystyrene, but they have the undesirable effect of increasing the alternating current power factor of the resulting plasticised polystyrene many times as compared with that of unplasticised polystyrene.

It is an object of the present invention to provide an electric insulating material comprising polystyrene to which a full and permanent degree of plasticisation or softening has been imparted, without appreciable deterioration of the electrical properties and more particularly of the alternating current power factor at frequencies of $10^6$ cycles per second or higher.

According to the present invention electrical insulating material comprises polystyrene together with a hydrocarbon compound the molecule of which consists partly of one or more homocyclic rings and partly of aliphatic chains, but with not more than three such chains attached to any one ring, said compound having a molecular weight between 160 and 480, a melting point not higher than 70° C. and a boiling point not less than 240° C.

As certain groups other than hydrocarbon groups produce only a slight deterioration in the electrical properties of the plasticiser, all the derivatives of the above compounds that have a single carboxylic, carboxylic ester, keto or etheric group or that have two carboxylic, carboxyl- ic ester, keto or etheric groups arranged symmetrically are also included.

The following are examples of suitable compounds, mixtures of which with polystyrene are electrical insulating materials according to the invention.

| Compound | Melting Point in ° C. | Boiling Point in ° C. |
|---|---|---|
| Diphenylmethane | 27 | 261–262. |
| 1.3 Diphenylpropane | liquid at ordinary temp. | 302. |
| 1.1 Diphenyl-n-butane | 27 | 286–8. |
| 1.2 Diphenyl-n-butane | liquid | 289 at 750 mm. |
| 1.3 Diphenyl-n-butane | ----do---- | 295. |
| 1.4 Diphenyl-n-butane | 52 | 317. |
| 2.3 dl.Diphenyl-n-butane | 8 | 283–4. |
| 2.2' Ditolyl | 18 | 258 at 738 mm. |
| 3.3' Ditolyl | 5–7 | 286–7 at 713 mm. |
| 3.4' Ditolyl | 14–15 | 288–9 at 752 mm. |
| 1.1' di-p-tolylethane | below —10 | 295–300. |
| Di-p-tolylmethane | 28 | 285–5. |
| Benzyl-mesitylene | 36 | 301. |
| 1.1.2 Triphenylethane | 54.5 | 348–9. |
| 1.1 Diphenylethylene | 8 | 277. |
| 1.1 Diphenylpropylene | 52 | 280–1. |
| 1.1 Diphenylbutylene 1 | liquid | 295–7. |
| 1.2 Diphenylbutylene 1 | 57 | 296–7. |
| 1.3 Diphenylbutylene 1 | liquid | 310–2. |
| Dibenzylketone | 35 | 330. |
| Dibenzylacetone | 13–14 | 352. |
| Phenyl-o-tolyl ketone | less than 18° C | 316. |
| Benzyl benzoate | 18.5° | 324. |
| Benzyl-phenyl-ether | 39° | 298–300. |
| Hydrogenated triphenyl methane (prepared by the method of Godchot, Comptes Rendus 147,1057 (1908) by using nickel on asbestos as catalyst. | liquid at ordinary temp. | 270. |

These compounds may be mixed in suitable proportions with polystyrene by adding to styrene before polymerisation, by hot rolling with polystyrene, by hot stirring with polystyrene (with or without pressure and with or without the presence of an atmosphere of inert gas such as nitrogen or carbon dioxide), or by dissolving along with polystyrene in a mutual solvent and subsequently evaporating the solvent.

As specific examples, the following are given (in all the following examples the polystyrene mentioned is of molecular weight 80,000):

(1) Diphenylmethane can be mixed with polystyrene in all proportions to give a series of mixtures having a wide range of physical properties. When equal amounts by weights are mixed, for example, a thick homogeneous liquid is obtained suitable for the impregnation of fibrous materials or for filling spaces associated with electrical apparatus. Its power factor at $10^6$ cycles per second is 0.0003.

(2) 100 grams of one of the ditolyls mentioned in the table mixed with 100 grams of polystyrene by heating and stirring yields a thick colourless liquid when allowed to cool. The power factor of the mixture is 0.0004 at $10^6$ cycles per second.

10 grams of one of the ditolyls mentioned mixed by heating with 90 grams of polystyrene gave a solid mixture slightly softer than polystyrene and having a power factor of 0.0003 at $10^6$ cycles per second.

(3) 100 grams of 1.2 diphenyl-n-butane mixed with 100 grams of polystyrene gave a very thick colourless liquid having a power factor of 0.0003 at $10^6$ cycles per second. 10 grams of 1.2 diphenyl-n-butane gave a colourless resin slightly softer than the original polystyrene and having a power factor of 0.0003 at $10^6$ cycles per second.

(4) 100 grams of 1.1 di-p-tolyl ethane mixed with 100 grams of polystyrene yielded a very thick colourless liquid having a power factor of 0.0003 at $10^6$ cycles per second. 10 grams of 1.1 di-p-tolyl ethane mixed with 90 grams of polystyrene yielded a colourless resin having a power factor of 0.0003 at $10^6$ cycles per second.

What is claimed is:

A solid insulating material that comprises nine parts by weight of a styrene polymer having a molecular weight of 80,000 and homogeneously distributed therein one part by weight of 2:2'-ditolyl, said insulating material being characterized by having a power factor not greatly in excess of 0.0003 at $10^6$ cycles and by having substantially permanently unvarying plasticity.

ARCHIBALD ALAN NEW.

REFERENCES CITED

The following references are of record in the file of this patent:

UNITED STATES PATENTS

| Number | Name | Date |
|---|---|---|
| 1,617,237 | Davidson | Feb. 8, 1927 |
| 1,891,601 | Lawson | Dec. 20, 1932 |
| 2,161,558 | Coleman et al. | June 6, 1939 |
| 2,193,613 | Alexander | Mar. 12, 1940 |
| 2,213,201 | Britton et al. | Sept. 3, 1940 |
| 2,272,996 | Warner et al. | Feb. 10, 1942 |
| 2,285,562 | Britton et al. | June 9, 1942 |
| 2,056,796 | Macht | Oct. 6, 1936 |

FOREIGN PATENTS

| Number | Country | Date |
|---|---|---|
| 491,576 | Great Britain | Nov. 28, 1936 |